Sept. 27, 1960
H. E. ENGLESON ET AL
2,954,115
DOUBLE EJECTOR
Filed Nov. 7, 1957
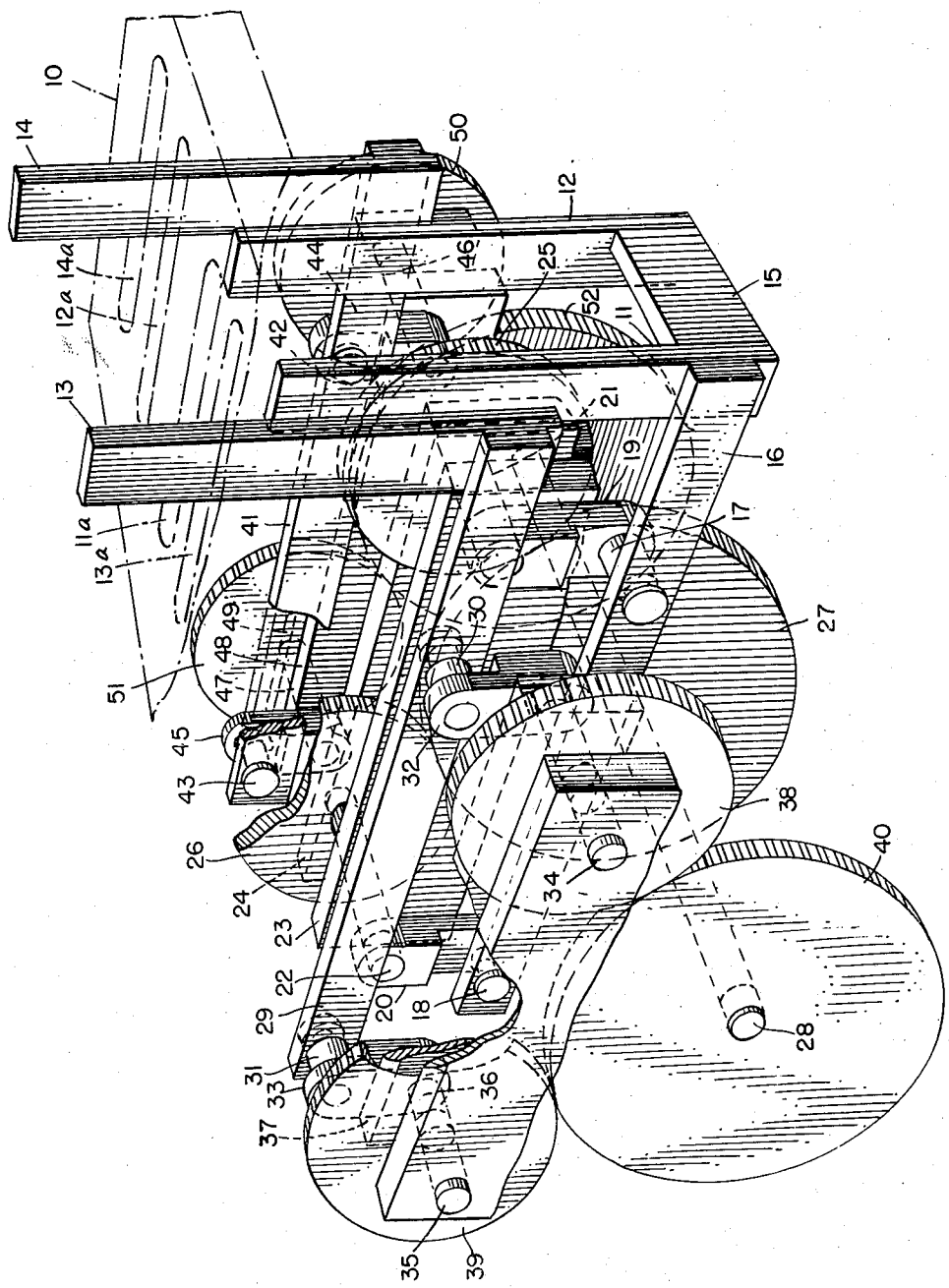
INVENTORS:
HARRY E. ENGLESON
ELMER D. SRAMEK
BY *Mayall, Johnston, Cook + Root*
ATT'YS United States Patent Office 2,954,115
Patented Sept. 27, 1960

2,954,115

DOUBLE EJECTOR

Harry E. Engleson, Chicago, and Elmer D. Sramek, Cicero, Ill., assignors to F. B. Redington Co., Bellwood, Ill., a corporation of Delaware Filed Nov. 7, 1957, Ser. No. 694,984

2 Claims. (Cl. 198—221)

This invention relates to a transfer mechanism for transferring articles along a surface, and more particularly to a reciprocating conveyer.

The highly competitive field of packaging has demanded packaging machines which are able to package at greater speeds in order to increase the unit output. Accordingly, packaging machine manufacturers are endeavoring to speed up the packaging of articles as well as to speed up the transfer of packaged articles from the packaging machine to a receiving station. One of the methods used to advance packaged articles along a surface from the packaging machine to a receiving station is by use of a reciprocating ejector having a single crank or pusher arrangement. However, such an arrangement is too slow for present day packaging machines.

The ejector arrangement of the present invention overcomes the above difficulty, wherein a double crank arrangement or pusher arrangement is employed in order to double the speed of transfer of articles along the horizontal surface.

Accordingly, it is an object of this invention to provide an improved ejector device for a use in connection with packaging machines.

Another object of this invention resides in the provision of an ejector or reciprocating conveyer having a double crank or pusher arrangement, whereby substantial gains in speed of advancing articles are obtained.

Still another object of this invention is in the provision of a transfer mechanism for transferring articles along the surface which includes a double crank arrangement to thereby give more speed in advancing articles along a surface and serving to enhance the speed of output of present day packaging machines.

Other objects, features, and advantages of the invention will be apparent from the following detailed disclosure, taken in conjunction with the accompanying sheet of drawings, wherein like reference numerals refer to like parts, in which:

The single figure in the drawing is a perspective view of an ejector embodying the invention.

Referring now to the drawing, the ejector of this invention is shown in association with a table 10, whereby articles are advanced along the top surface of the table. The ejector comprises in general a pair of pusher members 11 and 12 and a second pair of pusher members 13 and 14 arranged to be driven through an arcuate path and 180° out of phase of each other. The pusher members 11 and 12 are arranged to be driven through arcuate paths and are aligned to operate in slots 11a and 12a formed in the table 10, while the pusher members 13 and 14 are arranged to operate in slots 13a and 14a in the table. The table 10 is only illustrative of the type that may be employed since a table formed completely of interconnected bars or the like may also be sufficient for supporting the articles desired to be advanced or ejected by the ejector. The ejector may also be useful to eject articles in any other manner desired.

The pusher members 11 and 12 are interconnected by a cross bar 15 and in turn are connected to the forward end of a horizontally extending support bar 16. The horizontal bar 16 has journalled therein in spaced relationship crankpins 17 and 18 of front and rear cranks 19 and 20, respectively. The front and rear cranks 19 and 20 also include crankshafts 21 and 22, respectively which are bearingly supported in longitudinally extending parallel spaced frame members 23 and 24. Arranged between the frame members and mounted respectively on the front and back crankshafts 21 and 22 are front and back driven gears 25 and 26, both of which are in meshing engagement with a driving gear 27 mounted on a common drive shaft 28. Thus, on the driving of the drive shaft 28, the driven gears 25 and 26 are driven in the same direction to actuate the cranks 19 and 20 and drive the pusher members reciprocably through an arcuate path whereby they will enter the slots at one end of the table and advance an article therealong and disappear into the slots at the other end of the table.

The front pusher member 13 is similarly mounted wherein it is secured to the front end of a horizontally extending support bar 29 having spaced crankpins 30 and 31 journalled therein, the crankpins being part of the cranks 32 and 33, respectively. The cranks 32 and 33 also respectively include crankshafts 34 and 35 bearingly supported in longitudinally extending parallel spaced frame members 36 and 37. Driven gears 38 and 39 are respectively arranged between the frame members 36 and 37 and mounted on the crankshafts 34 and 35, and are in meshing engagement with a drive gear 40 also mounted on the common drive shaft 28, whereby actuation of the drive shaft 28 effects operation of the pusher member 13 through the gearing and crank arrangement just described.

The coaligned pusher member 14 is similarly supported and driven, wherein it is secured to the fore end of the horizontal support bar 41 which has journalled in spaced relationship therealong crankpins 42 and 43 of cranks 44 and 45 respectively. The cranks 44 and 45 also include crankshafts 46 and 47 bearingly supported in longitudinally extending and parallel spaced frame members 48 and 49. Secured to the crankshafts 46 and 47 and also arranged between the frame members 48 and 49 are driven gears 50 and 51 respectively which are in meshing engagement with a drive gear 52 also mounted on the common drive shaft 28. Thus, upon actuation of the drive shaft 28, the drive gear 52 and the driven gears 50 and 51 will be operated to reciprocate the pusher member 14.

The cranks and crankpins of the pusher members 13 and 14 are coaligned so that these pusher members operate together in unison in order to advance the article along the table top, while the cranks and crankpins of the pusher members 11 and 12 are arranged 180° out of phase with the cranks and crankpins of the pusher members 13 and 14 so that when the pusher members 13 and 14 are in operative position to advance an article on the table top surface, the pusher members 11 and 12 are in non-operating position. As the pusher members 13 and 14 complete their stroke to advance an article along the table top, the pusher members 11 and 12 begin to come into operation to advance the next article along the table top surface. Thus, it is not necessary to wait until the first pusher members have made a complete arcuate path before another article can be advanced along the table top surface, and increased speed of operation is obtained. Further, the ejector of the present invention may be utilized to eject articles from a bucket conveyer, or the like, wherein the double crank and pusher arrangement will greatly or doubly increase the speed of operation of ejection.

It will be understood that modifications and variations may be effected without departing from the scope of the The invention is hereby claimed as follows:

1. Apparatus for advancing articles along the upper surface of a horizontal table comprising a first pair of vertical advancing members adapted to project upwardly through slots in the table and move relative to the table to advance articles therealong during the advancing stroke of said members, means for securing said members together, a first horizontal bar below the table supporting the members, a pair of longitudinally spaced cranks having crankshafts bearingly supported below the table and crankpins journally supporting said horizontal bar, means for driving said cranks in unison thereby orbitally oscillating said advancing members, said cranks causing said advancing members to return below the upper surface of said table during the return stroke thereof, a second pair of vertical advancing members adapted to project upwardly through slots in the table and move relative to the table to advance articles therealong during the advancing stroke of said members and during the return stroke of the first pair of advancing members, second horizontal bars supporting each of said second pair of advancing members arranged below the table, a pair of second longitudinally spaced cranks along each of said second horizontal bars, each second crank having a second crankshaft bearingly supported below the table and a crankpin journally supporting each of said second horizontal bars, second means for driving said second cranks in unison, and common drive means for driving both said driving means so that the first and second advancing members operate 180° out of phase.

2. Apparatus for advancing articles along the upper surface of a horizontal table comprising a first pair of vertical advancing members adapted to project upwardly through slots in the table and move relative to the table to advance articles therealong during the advancing stroke of said members, means for securing said members together, a first horizontal bar below the table supporting the members, a pair of longitudinally spaced cranks having crankshafts bearingly supported below the table and crankpins journally supporting said horizontal bar, a gear on each crankshaft, a first common gear in driving meshing engagement with said gears and mounted on a common drive shaft, said cranks causing said advancing members to return below the upper surface of said table during the return stroke thereof, a second pair of vertical advancing members adapted to project upwardly through slots in the table and move relative to the table to advance articles therealong during the advancing stroke of said members and during the return stroke of the first pair of advancing members, second horizontal bars supporting each of said second pair of advancing members arranged below the table, a pair of second longitudinally spaced cranks along each of said second horizontal bars, each second crank having a second crankshaft bearingly supported below the table and a crankpin journally supporting each of said second horizontal bars, second gears on each of said second crankshafts, and second common gears in driving meshing engagement with said second gears and mounted on said common drive shaft, said gears being arranged so that the first and second advancing members operate 180° out of phase.

References Cited in the file of this patent
UNITED STATES PATENTS

| 173,042 | Morrison | Feb. 1, 1876 |
| 823,751 | Adshead | June 19, 1906 |